US011170113B2

(12) United States Patent
Siman et al.

(10) Patent No.: US 11,170,113 B2
(45) Date of Patent: Nov. 9, 2021

(54) MANAGEMENT OF SECURITY VULNERABILITIES

(71) Applicant: CHECKMARX LTD., Ramat Gan (IL)

(72) Inventors: Maty Siman, Tel Aviv (IL); Alexander Roichman, Petah Tikva (IL); Shimon Eshkenazi, Bat-Yam (IL)

(73) Assignee: CHECKMARX LTD., Ramat Gan (IL)

( * ) Notice: Subject to any disclaimer, the term of this patent is extended or adjusted under 35 U.S.C. 154(b) by 194 days.

(21) Appl. No.: 16/333,247

(22) PCT Filed: Jan. 1, 2018

(86) PCT No.: PCT/IB2018/050003
§ 371 (c)(1),
(2) Date: Mar. 14, 2019

(87) PCT Pub. No.: WO2018/127794
PCT Pub. Date: Jul. 12, 2018

(65) Prior Publication Data
US 2019/0325145 A1 Oct. 24, 2019

Related U.S. Application Data

(60) Provisional application No. 62/441,986, filed on Jan. 4, 2017.

(51) Int. Cl.
*G06F 21/00* (2013.01)
*G06F 21/57* (2013.01)
(Continued)

(52) U.S. Cl.
CPC ............ *G06F 21/577* (2013.01); *G06F 21/54* (2013.01); *G06F 21/562* (2013.01); *G06F 21/566* (2013.01); *G06F 2221/033* (2013.01)

(58) Field of Classification Search
CPC ...... G06F 21/577; G06F 21/54; G06F 21/562; G06F 21/566; G06F 2221/033; G06F 21/57
See application file for complete search history.

(56) References Cited

U.S. PATENT DOCUMENTS 8,782,435 B1 * 7/2014 Ghose ................... G06F 9/3834
713/190
9,454,659 B1 * 9/2016 Daymont ............ G06F 11/3668
(Continued)

FOREIGN PATENT DOCUMENTS

CN 102521542 A * 6/2012
CN 102622299 B * 10/2014
(Continued)

OTHER PUBLICATIONS

EP Application # 18736396.5 Search Report dated Aug. 6, 2020.
(Continued)

*Primary Examiner* — Andrew J Steinle
*Assistant Examiner* — Hassan A Hussein
(74) *Attorney, Agent, or Firm* — Kligler & Associates Patent Attorneys Ltd

(57) ABSTRACT

A method for testing a software application program (22) includes storing in a vulnerability database records of security vulnerabilities identified in execution of the program. Each record includes a location field containing a respective signature indicative of a location in the execution at which a corresponding security vulnerability was detected and a metadata field indicative of a respective control flow path on which the corresponding security vulnerability occurred. Upon detecting a further security vulnerability at a given location in a subsequent execution of the program, a new signature of the given location is computed and compared to the location field of the records in the database. When no record is found to match the new signature, an indication is
(Continued)

output to a developer of the program of an occurrence of a new security vulnerability.

25 Claims, 5 Drawing Sheets

(51) Int. Cl.
*G06F 21/54* (2013.01)
*G06F 21/56* (2013.01)

(56) References Cited

U.S. PATENT DOCUMENTS

| | | | | |
|---|---|---|---|---|
| 9,813,450 | B1* | 11/2017 | Wasiq | H04L 63/20 |
| 2005/0005152 | A1* | 1/2005 | Singh | G06F 21/577 |
| | | | | 726/26 |
| 2005/0273859 | A1* | 12/2005 | Chess | G06F 21/577 |
| | | | | 726/25 |
| 2007/0240222 | A1* | 10/2007 | Tuvell | G06F 16/245 |
| | | | | 726/24 |
| 2009/0144827 | A1* | 6/2009 | Peinado | H04L 63/1433 |
| | | | | 726/25 |
| 2010/0083240 | A1* | 4/2010 | Siman | G06F 16/245 |
| | | | | 717/144 |
| 2014/0082737 | A1* | 3/2014 | Beskrovny | H04L 63/1433 |
| | | | | 726/25 |
| 2014/0165204 | A1* | 6/2014 | Williams | H04L 63/02 |
| | | | | 726/25 |
| 2014/0173737 | A1* | 6/2014 | Toback | G06F 21/57 |
| | | | | 726/25 |
| 2014/0201842 | A1* | 7/2014 | Tripp | G06F 21/56 |
| | | | | 726/25 |
| 2014/0283081 | A1* | 9/2014 | Sheridan | G06F 21/564 |
| | | | | 726/25 |
| 2015/0101057 | A1* | 4/2015 | Fingold | H04L 63/1433 |
| | | | | 726/25 |
| 2016/0078231 | A1* | 3/2016 | Bach | H04L 67/025 |
| | | | | 726/25 |
| 2016/0119148 | A1* | 4/2016 | Ghose | G06F 21/602 |
| | | | | 713/176 |
| 2016/0246965 | A1* | 8/2016 | Cornell | G06F 21/577 |
| 2016/0300063 | A1* | 10/2016 | Daymont | G06F 21/566 |
| 2016/0359896 | A1* | 12/2016 | Hay | H04L 63/1425 |
| 2017/0019422 | A1* | 1/2017 | Makowski | H04L 63/1433 |
| 2017/0270303 | A1* | 9/2017 | Roichman | G06F 11/3668 |
| 2021/0056206 | A1* | 2/2021 | Hirano | G06F 21/552 |

FOREIGN PATENT DOCUMENTS

| | | | | |
|---|---|---|---|---|
| WO | WO-2014049504 A1 * | 4/2014 | | G06F 8/53 |
| WO | 2016108162 A1 | 7/2016 | | |
| WO | WO-2016108162 A1 * | 7/2016 | | G06F 8/75 |
| WO | 2017163141 A1 | 9/2017 | | |
| WO | WO-2017163141 A1 * | 9/2017 | | G06F 11/3684 |

OTHER PUBLICATIONS

Goldsmith et al., "Relational Queries Over Program Traces", Annual ACM SIGPLAN Conference on Object-Oriented Programming, Systems, Languages, and Applications (OOPSLA'05), pp. 1-18, San Diego, USA, Oct. 16-20, 2005.
Wikipedia, "QL definition", 2 pages, Dec. 21, 2017.
Jarchitect, "CQLinq: Code Query Linq", pp. 1-7, years 2009-2019.
International Application # PCT/IB2018/050003 search report dated Apr. 12, 2018.
Checkmarx, "CxEnterprise CxQuery API Guide", V8.2, pp. 1-314, Jun. 2016.
Checkmarx Knowledge Center, "Query Coding Example", pp. 1-2, May 26, 2019.

* cited by examiner

MANAGEMENT OF SECURITY VULNERABILITIES

CROSS-REFERENCE TO RELATED APPLICATION

This application claims the benefit of U.S. Provisional Patent Application 62/441,986, filed Jan. 4, 2017, which is incorporated herein by reference.

FIELD OF THE INVENTION

The present invention relates generally to protecting against security vulnerabilities in computer programs, and particularly to methods, systems and software for testing application security.

BACKGROUND

Various techniques are known in the art for testing and protecting software applications against security vulnerabilities. A "vulnerability" in this context is a flaw or weakness in the application program that can be exploited by an unauthorized party (also referred to as an attacker) to gain access to secure information or otherwise modify the behavior of the program. For example, static application security testing (SAST) techniques are typically applied in order to detect security vulnerabilities in source code before the code is compiled and run. Dynamic application security testing (DAST), on the other hand, approaches the application as a "black box," and attempts to find vulnerabilities by bombarding the application during runtime with potentially harmful inputs.

As another example, runtime application self-protection (RASP) techniques can be used to protect software applications against security vulnerabilities by adding protection features into the application. In typical RASP implementations, these protection features are instrumented into the application runtime environment, for example by making appropriate changes and additions to the application code and/or operating platform. The instrumentation is designed to detect suspicious behavior during execution of the application and to initiate protective action when such behavior is detected. RASP techniques are described, for example, in PCT International Publication WO 2016/108162, whose disclosure is incorporated herein by reference.

Interactive application security testing (IAST) combines features of DAST and other testing techniques. This sort of approach is described, for example, in PCT International Publication WO 2017/163141, whose disclosure is incorporated herein by reference. After recording a sequence of functional tests that are applied to a program under test, the IAST system automatically modifies one or more of the recorded functional tests to contain attack payloads, and then applies the modified tests to the application in order to detect security vulnerabilities in the program. These IAST scenarios may be run in conjunction with instrumentation of the application code in order to facilitate automatic identification of security vulnerabilities.

SUMMARY

Embodiments of the present invention that are described hereinbelow provide improved methods, systems and software for testing security of software applications.

There is therefore provided, in accordance with an embodiment of the invention, a method for testing a software application program. The method includes storing in a vulnerability database records of security vulnerabilities identified in execution of the program. Each record including a location field containing a respective signature indicative of a location in the execution at which a corresponding security vulnerability was detected and a metadata field indicative of a respective control flow path on which the corresponding security vulnerability occurred. A further security vulnerability is detected at a given location in a subsequent execution of the program, and a new signature of the given location is computed and compared to the location field of the records in the database. When no record is found to match the new signature, an indication is output to a developer of the program of an occurrence of a new security vulnerability.

Typically, the method includes adding a new record to the database with respect to the new security vulnerability.

Additionally or alternatively, the method includes extracting metadata with respect to the control flow path on which the further security vulnerability occurred, and when the new signature is found to match the signature of a given record in the database, comparing the extracted metadata to the metadata field in the given record in order to classify the further security vulnerability as a recurrent or new security vulnerability. In a disclosed embodiment, the metadata field in each record contains a hash computed over the location, the control flow path, and a type of the corresponding security vulnerability, and comparing the extracted metadata includes computing the hash for the further security vulnerability, and matching the computed hash to the hash in the given record.

In some embodiments, the method includes traversing, in the subsequent execution of the program, a further location at which no security vulnerability is detected, and computing a further signature of the further location and comparing the further signature to the location field of the records in the database. When one of the records is found to match the new signature, an indication is output to the developer of the program that the corresponding security vulnerability has been resolved.

Further additionally or alternatively, the method includes, after completing the subsequent execution of the program without having traversed the respective control flow path of a given security vulnerability that is recorded in the database, indicating to the developer of the program that a state of the given security vulnerability is unknown due to insufficient coverage.

In a disclosed embodiment, the control flow path in the metadata field is identified by at least a source and a sink of data processed at the location of the corresponding security vulnerability.

In one embodiment, the location at which each of the security vulnerabilities was found to occur corresponds to a request submitted to a server running the program, and the request is normalized by replacing variable parameters in the request with constant placeholders prior to computing the respective signature.

Additionally or alternatively, the method includes, prior to the execution of the program, instrumenting the program with instructions configured to detect the security vulnerabilities and output the location and metadata with respect to the control flow path of each of the security vulnerabilities.

There is also provided, in accordance with an embodiment of the invention, apparatus for testing a software application program, including a memory, which is configured to store a vulnerability database containing records of security vulnerabilities identified in execution of the program. Each record includes a location field containing a respective signature indicative of a location in the execution at which a corresponding security vulnerability was detected and a metadata field indicative of a respective control flow path on which the corresponding security vulnerability occurred. A processor is configured to detect a further security vulnerability at a given location in a subsequent execution of the program, to compute a new signature of the given location and comparing the new signature to the location field of the records in the database, and when no record is found to match the new signature, to output an indication to a developer of the program of an occurrence of a new security vulnerability.

There is additionally provided, in accordance with an embodiment of the invention, a computer software product for testing a software application program. The product includes a non-transitory computer-readable medium in which program instructions are stored. The instructions, when read by a computer, cause the computer to store a vulnerability database containing records of security vulnerabilities identified in execution of the program, each record including a location field containing a respective signature indicative of a location in the execution at which a corresponding security vulnerability was detected and a metadata field indicative of a respective control flow path on which the corresponding security vulnerability occurred. The instructions cause the computer to detect a further security vulnerability at a given location in a subsequent execution of the program, to compute a new signature of the given location and comparing the new signature to the location field of the records in the database, and when no record is found to match the new signature, to output an indication to a developer of the program of an occurrence of a new security vulnerability.

There is further provided, in accordance with an embodiment of the invention, a method for testing a software application program. The method includes storing in a vulnerability database records of security vulnerabilities identified in execution of the program. Each record includes a location field containing a respective signature indicative of a location in the execution at which a corresponding security vulnerability was detected and a metadata field indicative of a respective control flow path on which the corresponding security vulnerability occurred. Upon detecting a further security vulnerability at a given location in a subsequent execution of the program, a new signature of the given location is computed and compared to the location field of the records in the database. Metadata is extracted with respect to the control flow path on which the further security vulnerability occurred. When the new signature is found to match the signature of a given record in the database, the extracted metadata are compared to the metadata field in the given record in order to classify the further security vulnerability as a recurrent or new security vulnerability.

The present invention will be more fully understood from the following detailed description of the embodiments thereof, taken together with the drawings in which:

DETAILED DESCRIPTION OF EMBODIMENTS

Overview

Figure 1:
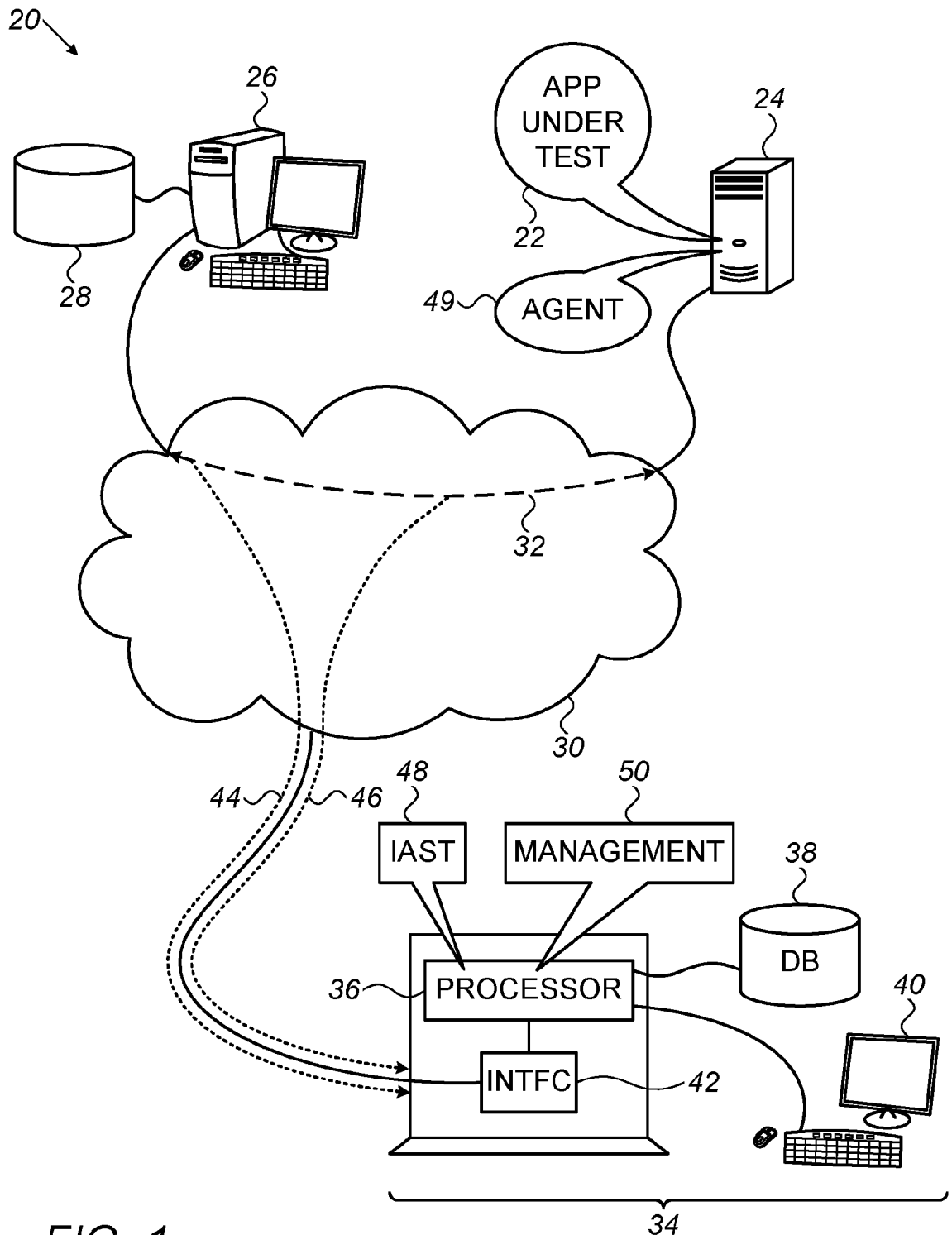
FIG. 1 is a block diagram that schematically illustrates a system for testing a software application, in accordance with an embodiment of the invention.

Embodiments of the present invention assist software developers automatically in managing and monitoring security vulnerabilities over the course of the software development life cycle. These embodiments are useful particularly in conjunction with dynamic application security tools, such as DAST and IAST, but they may also incorporate information provided by other testing tools, such as source code analysis and other SAST tools. In the context of the present patent application, IAST can be used in both an active mode, in conjunction with simulated attacks on the software under test (as described in the Background section), and in a passive mode, in which the IAST tool simply observes the performance of the software without attack simulation.

Both types of IAST (active and passive) are able to find vulnerabilities; but for an IAST tool to be really useful as part of the software development life cycle, it should be able not only to find vulnerabilities, but also to manage them. For instance, if an IAST tool finds an SQL injection vulnerability on a certain page of a Web application in a given version of the application software, it would be desirable to track this vulnerability through subsequent versions so that the development manager can ascertain whether the vulnerability has been resolved. To be effective in dealing with the complexity of typical software applications, however, this sort of tracking has to overcome a number of challenges, for example:

- Coverage depends on the messages, such as Hypertext Transfer Protocol (HTTP) requests, that are sent to the application under test.
- Correlation between requests sent and control flow paths inside the application is complex and not always consistent.
- This correlation can be further complicated by varying request values, which can affect the control flow paths inside the application.
- Correlation between control flow paths and vulnerabilities can also be difficult, i.e., a control flow path that led to a certain vulnerability in one test may not consistently lead to the vulnerability in subsequent tests.
- The application code changes from one version to the next, and it is difficult to trace a vulnerability over the time, even when the vulnerability remains the same, when the application context is changed.

Embodiments of the present invention address these difficulties in providing a vulnerability management tool that tracks and analyzes application security testing results over the course of successive software versions. It gives developers and managers a reliable, easy-to-use digest of the status of security vulnerabilities. The management tool is capable of determining whether a given vulnerability that has been found by IAST (or by another testing tool) is new—appearing for the first time in the current version—or is a recurrence of a vulnerability found in a previous version. The management tool can also determine that a vulnerability found on a given control path in a previous version has now been fixed, or that the previous vulnerability could not be found due to insufficient coverage of the current test run.

These facilities enable developers, such as programmers and their managers, to ensure that application security improves (or at least gets no worse) from version to version and, conversely, to reject a software build in which a new vulnerability has appeared. In some embodiments, the management tool is also able to collate test results in order to give users a more complete picture of application security, for example by presenting the current state of all existing vulnerabilities, as well as displaying all vulnerabilities found in any version and not yet resolved. As another example, the management tool can show the history of a given vulnerability, including the version in which it first appeared and how many times it has recurred.

As a corollary to these capabilities, in the disclosed embodiments, the management tool is able to track a detected vulnerability on a given page even when the data values associated with the page have changed. In other words, although the precise pattern that a given vulnerability presents to the testing tool may vary from run to run as a result of varying data values, the management tool normalizes variable parameters and is thus agnostic to data values. Consequently, the management tool will report only a single vulnerability notwithstanding changes in data values, and will likewise be able to detect when the vulnerability ceases to exist.

In embodiments of the present invention that are described hereinbelow, the management tool is implemented in software running on a general-purpose computer in conjunction with other security testing tools, such as IAST tools. The management tool receives and processes reports of security vulnerabilities from the other tools, which include the location (for example, the Web page on which the vulnerability was found) and the execution trace (for example, features of the control flow path) in which the vulnerability occurred. The management tool then computes a key corresponding to the vulnerability, for example in the form of a hash over a vulnerability ID (indicating the type of the vulnerability), the location parameters (such as the URL, with variable parameter values replaced by placeholders), and the execution trace features. The management tool stores a record of the vulnerability, including the hash key, in a database. In subsequent runs, upon receiving vulnerability reports, the management tool computes the corresponding hash keys, searches the database for a match, and classifies the vulnerability accordingly.

Although the embodiments described hereinbelow related specifically to Web applications, the principles of the present invention may similarly be applied, mutatis mutandis, to other application environments and various programming and scripting languages.

System Description

FIG. 1 is a block diagram that schematically illustrates a system 20 for testing a software application 22, in accordance with an embodiment of the invention. Software application 22 is also referred to as an "app" or "app under test," and for brevity is referred to simply as "application 22" in the description below. In the example shown in FIG. 1, application 22 is assumed to be a client/server application, such as a Web application, which runs on a server 24. A client station 26 applies test scenarios to application 22, for example by conveying requests to and receiving responses from server 24 via a network 30. The test scenarios are stored in a memory 28 of client station 26, and the requests and responses normally travel over a path 32 through network 30. Alternatively, other test configurations are possible, including configurations in which the client and server of application 22 run on the same physical machine, using different virtual machines, for example, with emulation of network communications between them.

A test and management station 34 runs an IAST tool 48, which communicates with an IAST agent 49 running on server 24. IAST tool 48 may operate in a passive mode, in which the IAST tool simply receives and processes reports from IAST agent 49. Optionally, IAST tool 48 may also actively send test instructions to and record communications between client station 26 and server 24 in order to generate and apply security tests to application 22. Prior to the execution of application 22, IAST agent 49 instruments the program code of the application with instructions configured to detect the security vulnerabilities and output the location and metadata with respect to the control flow path of each of these security vulnerabilities. These instrumentation and testing functions of IAST tool 48 and agent 49 are described in detail, for example, in the above-mentioned WO 2016/108162 and WO 2017/163141 publications. Additionally or alternatively, station 34 may run other sorts of static and dynamic test tools that are known in the art. In addition, station 34 runs a vulnerability management tool 50, whose general features and capabilities have been described above. Further details of vulnerability management tool 50 are presented hereinbelow.

Test and management station 34 typically comprises a general-purpose computer, comprising a processor 36, which is programmed in software to carry out the functions that are described herein. Tools 48 and 50 typically comprise software programs of this sort. This software may be downloaded to station 34 in electronic form, over a network, for example. Alternatively or additionally, the software may be stored on tangible, non-transitory computer-readable media, such as optical, magnetic or electronic memory media. Further alternatively or additionally, at least some of the functions of processor 36 may be implemented in hardwired or programmable hardware logic circuits. Furthermore, although test and management station 34 is shown and referred to in the figures as a separate, standalone unit, the functions of station 34 may alternatively be integrated and run on the same computer as those of client station 26.

Test and management station 34 comprises a memory 38, which stores a security vulnerability database, and a user interface 40, which enables testing personnel to manipulate the test scenarios that IAST tool 48 applies to application 22 (when operating in an active mode) and to view test results and vulnerability reports generated by processor 36. Station 34 is coupled to network 30 by a suitable network interface 42. Station 34 is thus able to intercept and record requests submitted by client station 26 to server 24, via an input path 44, and to intercept and record responses from server 24, via an output path 46. Security test scenarios developed by IAST tool 48 may be applied to server 24 by processor 36 over output path 46; or they may, alternatively or additionally, be downloaded to client station 26 for application to server 24.

Vulnerability Database

The security vulnerability database in memory 38 (referred to hereinafter simply as a "vulnerability database") contains records of security vulnerabilities that have been identified in execution of the program under test—application 22 in the present example. Each record corresponds to a security vulnerability that was detected in one or more execution runs and comprises a location field containing a signature indicating the location in the execution at which the vulnerability was detected. Each record also contains a metadata field, with information indicative of the control flow path on which the corresponding security vulnerability occurred. Specifically, in the present embodiment, the metadata field in each record contains a hash computed over the location, the control flow path, and the type of the corresponding security vulnerability.

Table I below presents an example of the structure of this sort of vulnerability database, used in testing of a Web application. For the sake of concreteness and clarity, this table and further examples herein refer specifically to testing of Web applications and contain certain specific types of data that are appropriate for tracking vulnerabilities in this context. Alternatively, the principles described herein may be applied, mutatis mutandis, using other sorts of location and metadata parameters, as well as to testing other sorts of software programs.

TABLE I

EXAMPLE VULNERABILITY DATABASE

| Result ID | Vulnerability ID | Vulnerability name | Location signature | Hash (key) | URL |
|---|---|---|---|---|---|
| 1 | 1 | SQL inject | 123 | 6786 | http://myApp/myPage?p=1 |
| 2 | 1 | SQL inject | 321 | 45678 | http://myApp/anotherpage |
| 3 | 2 | XSS | 123 | 8799 | http://myApp/myPage?p=1 |
| ... | | | | | |

In the table above, the vulnerability ID indicates the vulnerability type, for example:
1. SQL injection
2. Cross-site scripting (XSS)
3. Path traversal
4. . . .

The "location" in this example corresponds to the request submitted to server 24 at which the vulnerability was found, and specifically to the URL of the HTTP request at which the vulnerability occurred. (The URL itself is listed in the last column of the table.) The same request, however, may appear in different executions of the program (or even at different points in the same execution) with different parameters. To enable test and management station 34 to track vulnerabilities reliably notwithstanding the changes in parameters, processor 36 normalizes the location (i.e., the URL) by replacing variable parameters, which may occur in the query string, body and/or headers of the request, with constant placeholders. Processor 36 encodes this normalized location in a signature, for example using a suitable hash function, which computed over the normalized URL and stored in the location field of the corresponding record in the vulnerability database.

As one example, assume a vulnerability was found on an HTTP request containing the following URL: http://myServer/myPage.jsp?Name=Alex. Processor 36 will normalize the URL to http://myServer/myPage.jsp?Name=PLACE-HOLDER before computing the signature.

The replacement of parameter values with constant placeholders can be applied not only to standard query string/body formats, but also to REST-style (representational state transfer) URLs. For example: http://myServer/name/Alex/Age/10 will be replaced with http://myServer/name/PLACE-HOLDER/Age/PLACE-HOLDER before computation of the signature. The same technique can also be applied to JSON (JavaScript™ object notation) messages.

In some cases, URLs by themselves are not sufficient for computing location signatures that can be relied upon in tracking vulnerabilities. For example, in the URL http://mySite.com?abc=def, the first parameter does not have a constant name and can be varied from request to request. (The next request to the same page could be http://mySite.com?xyz=poi, for instance.) In such cases, processor 36 can compute location signatures over entry points of application 22. Such entry points can include doGet and doPost methods of Java™ servlets, for example, as well as custom methods. In the example above, both of the URLs will lead to the same entry point of doGet.

As noted above, the hash field in the table above is computed over the path metadata and other vulnerability features and serves as a key for matching vulnerabilities to database records. In the present example, the hash is computed over the location, as defined above; the type of the security vulnerability, given by the vulnerability ID in the table; and the control flow path on which the vulnerability occurred. The control flow path in the metadata field is identified by at least a source and a sink of the data that are processed at the location of the corresponding security vulnerability, and possibly also by metadata with respect to propagation of the data from the source to the sink.

The metadata with respect to the source and sink can indicate, for example, the application program interface (API) that was called in order to initiate the control flow path and the places of the source and sink in the application code. The metadata are chosen so that minor differences between similar paths (such as the number of iterations inside loops, the recursive call depth, and resolution of conditional statements) will be disregarded, giving the same source and sink information for all such paths. The extraction of this sort of metadata is illustrated by the following code:

```
String input = request.getQueryString("name");
if (input.length > 10){
    input = input.substring(0, 6);
}
jdbc.execute(" select * from table where name = '" +
    input + "'");
```

In this case, processor 36 will extract the following metadata:
request.getQueryString (source)
input.substring (propagator)
jdbc.execute (sink).

Tracking Security Vulnerabilities

Figure 2:
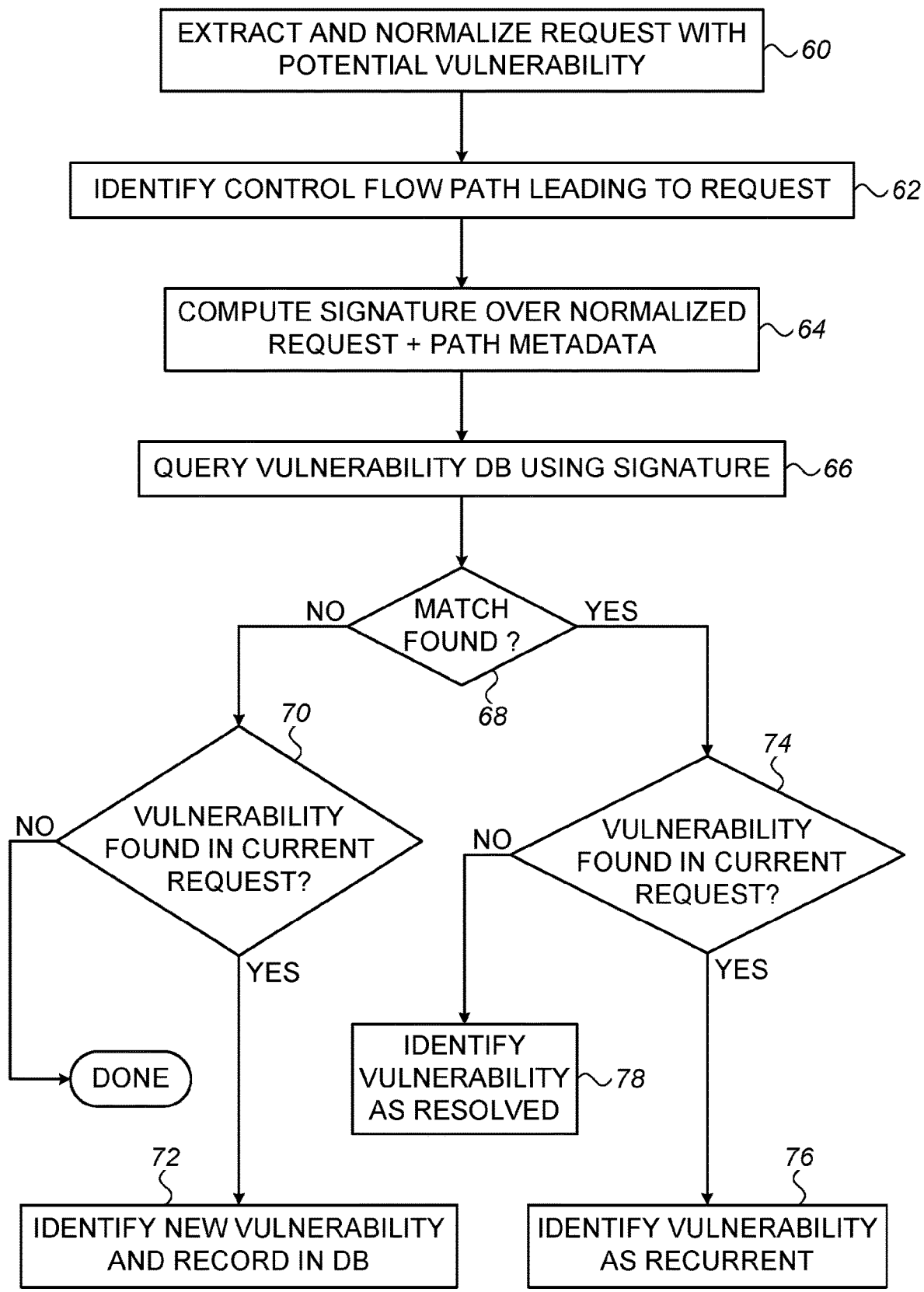
FIG. 2 is a flow chart, which schematically illustrates a method for managing vulnerabilities in a software application, in accordance with an embodiment of the invention.

FIG. 2 is a flow chart, which schematically illustrates a method for managing vulnerabilities in a software application, in accordance with an embodiment of the invention. This method is described, for the sake of convenience and clarity, with reference to testing of application 22 in the context of system 20, as shown in FIG. 1, and using the vulnerability database that was described above. Alternatively, the principles of this method may be applied, as noted above, to other sorts of programs and in other sorts of test environments.

The vulnerability database in memory 38 with respect to application 22 is typically built up and maintained by management tool 50, running on processor 36, over multiple execution runs, and typically over multiple different versions in the development life cycle of the application. As explained below in greater detail, when IAST tool 48 detects a security vulnerability at a given location in an execution of application 22, processor 36 computes the signature of the given location (after first normalizing any variable parameters) and compares this signature to the location signatures of the records in the database. When no record is found to match the new location signature, processor 36 outputs an indication to the program developer that a new security vulnerability has occurred. Typically, processor 36 will add a new record to the database with respect to this new security vulnerability.

The method of FIG. 2 is initiated when processor 36 encounters a request in application 22 at which IAST tool 48 has discovered an actual or potential vulnerability, at a request extraction step 60. Processor 36 may also extract requests from locations at which vulnerabilities were discovered in a previous execution of the program, in order to check whether the vulnerabilities at these locations have been resolved. In order to compare the extracted requests to the records in the vulnerability database, processor 36 normalizes the requests, as described above.

For requests at which vulnerabilities were found, processor 36 identifies the control flow path and extracts the path metadata, as was also described above, at a path extraction step 62. The processor computes the location signature for each request extracted at step 60, at a signature computation step 64. At this step, processor 36 also computes the hash key for vulnerabilities that were found at step 60, which can be based on the vulnerability type, normalized location, and path metadata, as was likewise explained above.

Processor 36 queries the vulnerability database in memory 38 using the location signature, at a querying step 66. Handling of the query depends upon whether the location signature of any of the records in the database is found to match the location signature in the query, at a matching step 68. If not, handling of the query depends upon whether processor 36 found an actual security vulnerability in the current request, at a vulnerability checking step 70. If so, processor 36 identifies the current request as containing a new vulnerability, which was not encountered previously, and adds a record of the vulnerability to the database, at a new vulnerability identification step 72. Otherwise, no further action is required.

When the location signature of the current request is found to match a record in the database at step 68, handling of the query again depends upon whether processor 36 found an actual security vulnerability in the current request, at a vulnerability checking step 74. If so, processor 36 compares the hash key computed at step 64 to the hash key of the record found at step 68. If the hash keys match, processor 36 classifies the vulnerability in the current request as a recurrent vulnerability, at a recurrent vulnerability identification step 76. Otherwise, if the location signatures match but the hash keys do not, processor 36 may identify the current vulnerability as a new vulnerability, and add a record to the database as in step 72.

On the other hand, if processor 36 found a match in the database to the location signature of the current request at step 68, but no vulnerability was found in the current request at step 74, processor 36 outputs an indication to the program developer that the corresponding security vulnerability has been resolved, at a vulnerability resolution step 78. In this case, the record of this vulnerability may be removed from the vulnerability database, or it may be marked as a resolved vulnerability.

The following examples illustrate the sorts of information that management tool 50 can provide to developers, using the method described above:

1. Tracking a vulnerability over time:

IAST tool 48 identifies an SQL injection vulnerability on the URL http://myServer/myPage.jsp?Name=Alex. Now each time management tool 50 encounters this URL and identifies an SQL injection vulnerability with the same control flow information, it classifies the vulnerability as "recurring," i.e., the same SQL injection as before. Later on when the management tool encounters the same URL with the same control flow but no SQL injection vulnerability—it indicates that this vulnerability is resolved.

2. Tracking the same vulnerability generated by requests with different input values:

IAST tool 48 identifies an SQL injection vulnerability on the URL: http://myServer/myPage.jsp?Name=Alex. Subsequently, when management tool 50 encounters the URL http://myServer/myPage.jsp?Name=Shimi with the same control flow, it ignores the specific parameter value and identifies the vulnerability as being the same, recurrent SQL injection vulnerability that is already listed in the vulnerability database. Later on, when the management tool encounters the URL http://myServer/myPage.jsp?Name=Maty with the same control flow and no identified SQL injection vulnerability, it classifies this vulnerability as resolved.

3. Identifying a new vulnerability on a request that is already known when a new input exposes the vulnerability:

Management tool 50 has recorded an SQL injection vulnerability on the URL http://myServer/myPage.jsp?Name=Alex. Now when the management tool encounters the URL http://myServer/myPage.jsp?Name=Shimi (same page, different parameter) with a different control flow, it means that a new trace through the application has been found, which was not seen before. Therefore, if an SQL injection vulnerability is found on this latter request, management tool 50 identifies it as a new SQL injection vulnerability.

In addition, management tool 50 may periodically check the records in the vulnerability database in order to identify records of vulnerabilities whose status has not changed over a certain period of time. If a vulnerability was found on a certain control flow path, and this path was not covered over a predefined period during subsequent development and testing, management tool 50 can alert the developer that the status of this vulnerability can no longer be reported with confidence. After completing an execution of the program (or possibly several executions) without having traversed the control flow path on which the vulnerability was recorded, the management tool will report to the developer that the state of this vulnerability is unknown due to insufficient coverage. For example, if the management tool recorded an SQL injection vulnerability on a certain control flow path, but then does not encounter this path over the next X tests, it can classify the recorded vulnerability as "unknown."

Figure 3A:
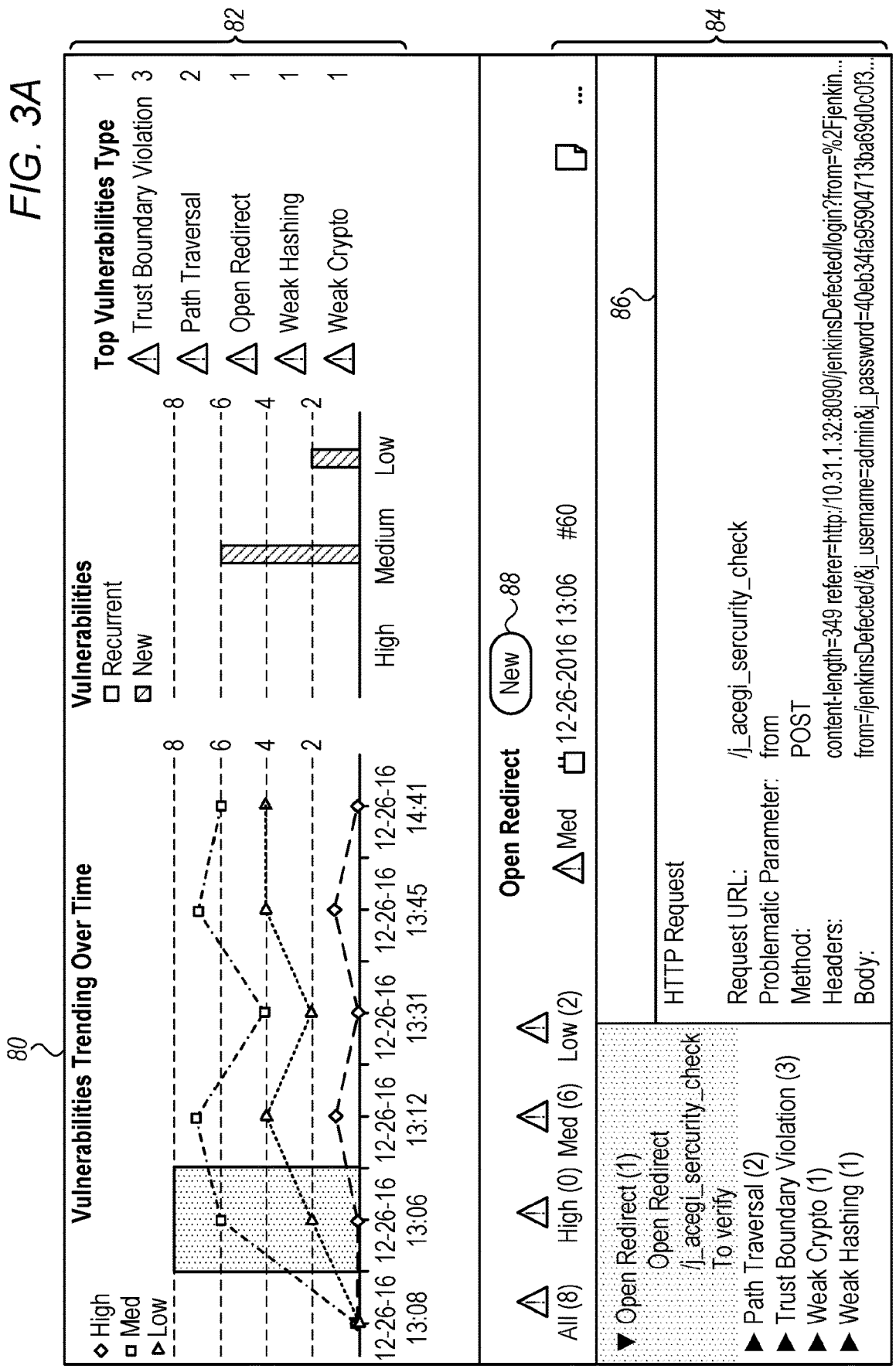
FIGS. 3A-C are schematic representations of computer screens generated by a security testing station, in accordance with an embodiment of the invention.
Figure 3B:
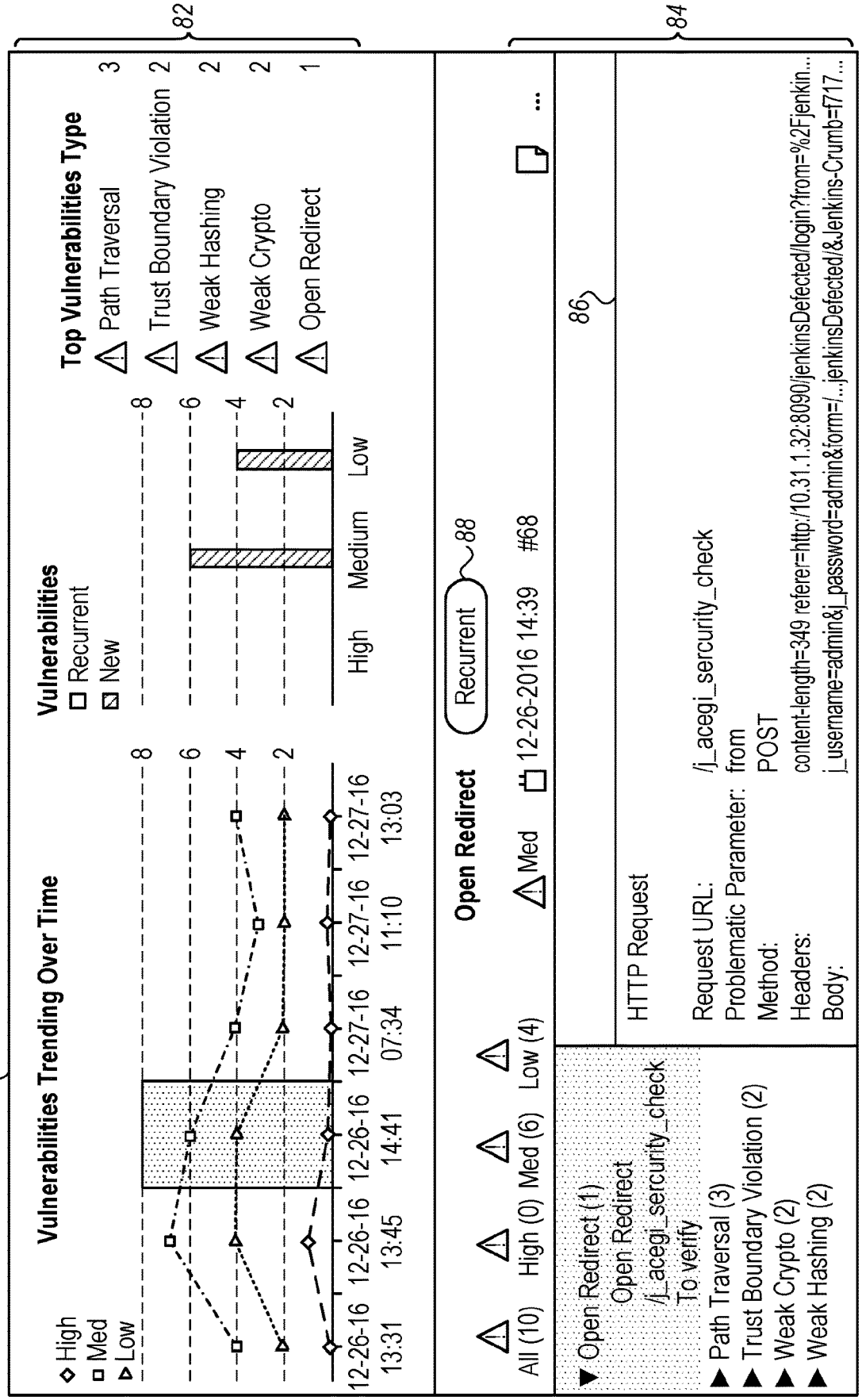
Figure 3C:
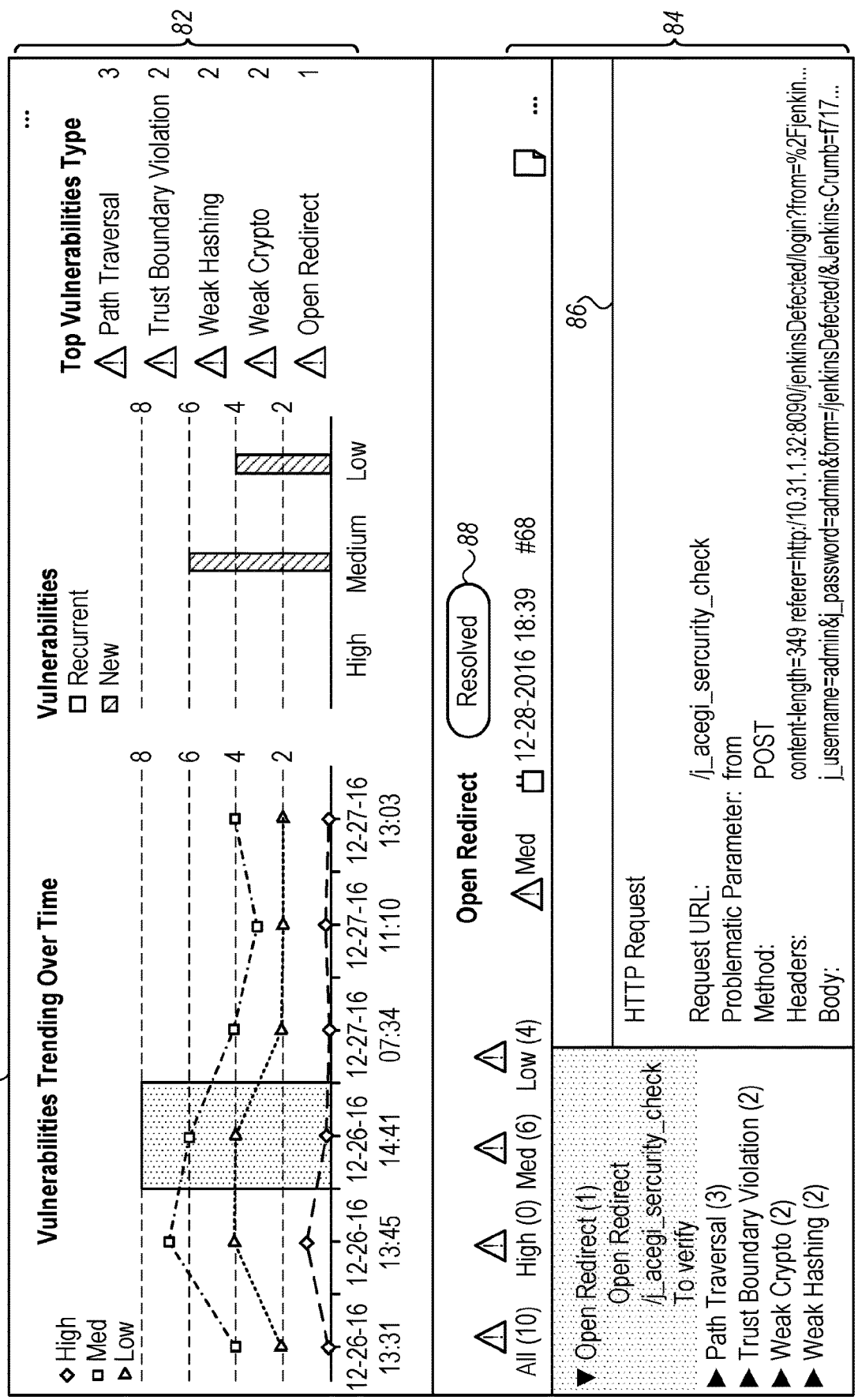

FIGS. 3A-C are schematic representations of computer screens 80 generated by test and management station 34, in accordance with an embodiment of the invention. Management tool 50 generates screens 80 based on the status of the vulnerability database in memory 38, including both general features and specific vulnerabilities. A general area 82 shows the overall status of the vulnerability database, including numbers and types of vulnerabilities. A tracking area 84 shows the details and status of selected individual vulnerabilities.

In the pictured example, tracking area 84 shows an Open Redirect vulnerability, with location and path parameters listed in a request parameters block 86. In FIG. 3A, this vulnerability has been identified for the first time (on Dec. 26, 2016) and is marked with a "new" flag 88. The same vulnerability was found to recur in a later execution of the program, as shown in FIG. 3B, and therefore flag 88 is now marked "recurrent." Finally, the vulnerability was no longer found in the program version executed on December 28, and flag 88 is therefore marked "resolved" in FIG. 3C.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for testing a software application program, comprising:
    storing in a vulnerability database records of security vulnerabilities identified in execution of at least a first version of the program, each record comprising a location field containing a respective signature indicative of a location in the execution at which a corresponding security vulnerability was detected and a metadata field indicative of a respective control flow path on which the corresponding security vulnerability occurred;
    detecting a further security vulnerability at a given location in a subsequent execution of a second version of the program, developed subsequently to the first version;
    computing a new signature of the given location and comparing the new signature to the location field of the records in the vulnerability database;
    when no record is found to match the new signature, outputting an indication to a developer of the program of an occurrence of a new security vulnerability; and
    after completing the subsequent execution of the program without having traversed the respective control flow path of a given security vulnerability that is recorded in the vulnerability database, indicating to the developer of the program that a state of the given security vulnerability is unknown due to insufficient coverage.

2. The method according to claim 1, and comprising adding a new record to the vulnerability database with respect to the new security vulnerability.

3. The method according to claim 1, and comprising:
    extracting metadata with respect to a further control flow path on which the further security vulnerability occurred; and
    when the new signature is found to match the respective signature of a given record in the vulnerability database, comparing the extracted metadata to the metadata field in the given record in order to classify the further security vulnerability as a recurrent or new security vulnerability.

4. The method according to claim 3, wherein the metadata field in each record contains a hash computed over the location, the respective control flow path, and a type of the corresponding security vulnerability, and wherein comparing the extracted metadata comprises computing the hash for the further security vulnerability, and matching the computed hash to the hash in the given record.

5. The method according to claim 1, and comprising:
    traversing, in the subsequent execution of the program, a further location at which no security vulnerability is detected;
    computing a further signature of the further location and comparing the further signature to the location field of the records in the vulnerability database; and
    when one of the records is found to match the new signature, indicating to the developer of the program that the corresponding security vulnerability has been resolved.

6. The method according to claim 1, wherein the respective control flow path in the metadata field is identified by at least a source and a sink of data processed at the location of the corresponding security vulnerability.

7. The method according to claim 1, wherein the location at which each of the security vulnerabilities was found to occur corresponds to a request submitted to a server running the program, and wherein the request is normalized by replacing variable parameters in the request with constant placeholders prior to computing the respective signature.

8. The method according to claim 1, and comprising, prior to the execution of the program, instrumenting the program with instructions configured to detect the security vulnerabilities and output the location and metadata with respect to the respective control flow path of each of the security vulnerabilities.

9. Apparatus for testing a software application program, comprising:
    a memory, which is configured to store a vulnerability database containing records of security vulnerabilities identified in execution of at least a first version of the program, each record comprising a location field containing a respective signature indicative of a location in the execution at which a corresponding security vulnerability was detected and a metadata field indicative of a respective control flow path on which the corresponding security vulnerability occurred; and
    a processor, which is configured to detect a further security vulnerability at a given location in a subsequent execution of a second version of the program, developed subsequently to the first version, to compute a new signature of the given location and comparing the new signature to the location field of the records in the vulnerability database, and when no record is found to match the new signature, to output an indication to a developer of the program of an occurrence of a new security vulnerability,
    wherein the processor is configured, after completing the subsequent execution of the program without having traversed the respective control flow path of a given security vulnerability that is recorded in the vulnerability database, to indicate to the developer of the program that a state of the given security vulnerability is unknown due to insufficient coverage.

10. The apparatus according to claim 9, wherein the processor is configured to add a new record to the vulnerability database with respect to the new security vulnerability.

11. The apparatus according to claim 9, wherein the processor is configured to extract metadata with respect to a further control flow path on which the further security vulnerability occurred, and when the new signature is found to match the respective signature of a given record in the vulnerability database, to compare the extracted metadata to the metadata field in the given record in order to classify the further security vulnerability as a recurrent or new security vulnerability.

12. The apparatus according to claim 11, wherein the metadata field in each record contains a hash computed over the location, the respective control flow path, and a type of the corresponding security vulnerability, and wherein the processor is configured to compute the hash for the further security vulnerability, and to match the computed hash to the hash in the given record.

13. The apparatus according to claim 9, wherein when the subsequent execution of the program traverses a further location at which no security vulnerability is detected, the processor is configured to compute a further signature of the further location and to compare the further signature to the location field of the records in the vulnerability database, and when one of the records is found to match the new signature, to indicate to the developer of the program that the corresponding security vulnerability has been resolved.

14. The apparatus according to claim 9, wherein the respective control flow path in the metadata field is identified by at least a source and a sink of data processed at the location of the corresponding security vulnerability.

15. The apparatus according to claim 9, wherein the location at which each of the security vulnerabilities was found to occur corresponds to a request submitted to a server running the program, and wherein the processor is configured to normalize the request by replacing variable parameters in the request with constant placeholders prior to computing the respective signature.

16. The apparatus according to claim 9, wherein the processor is configured, prior to the execution of the program, to instrument the program with instructions configured to detect the security vulnerabilities and output the location and metadata with respect to the respective control flow path of each of the security vulnerabilities.

17. A computer software product for testing a software application program, the product comprising a non-transitory computer-readable medium in which program instructions are stored, which instructions, when read by a computer, cause the computer to store a vulnerability database containing records of security vulnerabilities identified in execution of at least a first version of the program, each record comprising a location field containing a respective signature indicative of a location in the execution at which a corresponding security vulnerability was detected and a metadata field indicative of a respective control flow path on which the corresponding security vulnerability occurred,
  wherein the instructions cause the computer to detect a further security vulnerability at a given location in a subsequent execution of a second version of the program, developed subsequently to the first version, to compute a new signature of the given location and comparing the new signature to the location field of the records in the vulnerability database, and when no record is found to match the new signature, to output an indication to a developer of the program of an occurrence of a new security vulnerability,
  wherein the instructions cause the computer, after completing the subsequent execution of the program without having traversed the respective control flow path of a given security vulnerability that is recorded in the vulnerability database, to indicate to the developer of the program that a state of the given security vulnerability is unknown due to insufficient coverage.

18. The product according to claim 17, wherein the instructions cause the computer to add a new record to the vulnerability database with respect to the new security vulnerability.

19. The product according to claim 17, wherein the instructions cause the computer to extract metadata with respect to a further control flow path on which the further security vulnerability occurred, and when the new signature is found to match the respective signature of a given record in the vulnerability database, to compare the extracted metadata to the metadata field in the given record in order to classify the further security vulnerability as a recurrent or new security vulnerability.

20. The product according to claim 19, wherein the metadata field in each record contains a hash computed over the location, the respective control flow path, and a type of the corresponding security vulnerability, and wherein the instructions cause the computer to compute the hash for the further security vulnerability, and to match the computed hash to the hash in the given record.

21. The product according to claim 17, wherein when the subsequent execution of the program traverses a further location at which no security vulnerability is detected, the instructions cause the computer to compute a further signature of the further location and to compare the further signature to the location field of the records in the vulnerability database, and when one of the records is found to match the new signature, to output an indication to a developer of the program that the corresponding security vulnerability has been resolved.

22. The product according to claim 17, wherein the respective control flow path in the metadata field is identified by at least a source and a sink of data processed at the location of the corresponding security vulnerability.

23. The product according to claim 17, wherein the location at which each of the security vulnerabilities was found to occur corresponds to a request submitted to a server running the program, and wherein the instructions cause the computer to normalize the request by replacing variable parameters in the request with constant placeholders prior to computing the respective signature.

24. The product according to claim 17, wherein the instructions cause the computer, prior to the execution of the program, to instrument the program with instructions configured to detect the security vulnerabilities and output the location and metadata with respect to the respective control flow path of each of the security vulnerabilities.

25. A method for testing a software application program, comprising:
  storing in a vulnerability database records of security vulnerabilities identified in execution of at least a first version of the program, each record comprising a location field containing a respective signature indicative of a location in the execution at which a corresponding security vulnerability was detected and a metadata field indicative of a respective control flow path on which the corresponding security vulnerability occurred;
  detecting a further security vulnerability at a given location in a subsequent execution of a second version of the program, developed subsequently to the first version;
  computing a new signature of the given location and comparing the new signature to the location field of the records in the vulnerability database;

extracting metadata with respect to a further control flow path on which the further security vulnerability occurred; and when the new signature is found to match the respective signature of a given record in the vulnerability database, comparing the extracted metadata to the metadata field in the given record in order to classify the further security vulnerability as a recurrent or new security vulnerability.

\* \* \* \* \*